(12) United States Patent
Haney et al.

(10) Patent No.: US 8,460,549 B2
(45) Date of Patent: Jun. 11, 2013

(54) APPARATUS AND METHOD FOR THE NON-CHEMICAL STABILIZATION OF BIO-SOLIDS

(75) Inventors: Harold E. Haney, Lorraine (CA); Robert Freeman, Saint-Eustache (CA); Rodrigo Lobo Morales, Monterrey N.L. (ME); Daniel Gagnon, St-Mathieu-du-Parc (CA)

(73) Assignee: WM International Limited, Nassau (BS)

( * ) Notice: Subject to any disclaimer, the term of this patent is extended or adjusted under 35 U.S.C. 154(b) by 0 days.

(21) Appl. No.: 11/434,764

(22) Filed: May 17, 2006

(65) Prior Publication Data
US 2006/0261013 A1 Nov. 23, 2006

Related U.S. Application Data

(60) Provisional application No. 60/681,465, filed on May 17, 2005.

(51) Int. Cl.
*C02F 1/20* (2006.01)
(52) U.S. Cl.
USPC ............................ 210/631; 210/750; 210/764
(58) Field of Classification Search
USPC ................. 210/931, 600, 170.06, 194, 198.1, 210/199, 200, 201, 202, 205, 209, 219, 803, 210/768, 607, 609, 603, 604, 620, 631, 750, 210/764, 765; 422/905, 39; 95/260–262, 95/266; 96/193–196, 216, 217
See application file for complete search history.

(56) References Cited

U.S. PATENT DOCUMENTS

| 2,417,722 | A | | 3/1947 | Wolff | |
|---|---|---|---|---|---|
| 3,772,187 | A | * | 11/1973 | Othmer | 210/622 |
| 3,853,764 | A | * | 12/1974 | Armstrong | 210/195.1 |
| 4,042,494 | A | * | 8/1977 | Stoyer | 210/607 |
| 4,042,509 | A | | 8/1977 | Bowen | |
| 4,273,562 | A | * | 6/1981 | Niskanen | 95/261 |
| 4,597,876 | A | | 7/1986 | Hall | |
| 4,877,532 | A | * | 10/1989 | Haentjens et al. | 210/219 |

(Continued)

FOREIGN PATENT DOCUMENTS

| CA | 2 338 192 A1 | 2/2000 |
|---|---|---|
| CA | 2338192 A1 | 2/2000 |

(Continued)

OTHER PUBLICATIONS

Science, vol. 247, p. 1439, Suslick, Mar. 1990.*

(Continued)

*Primary Examiner* — Lucas Stelling
(74) *Attorney, Agent, or Firm* — Birch, Stewart, Kolasch & Birch, LLP

(57) ABSTRACT

An apparatus for treating an aqueous medium containing microorganisms comprises an intake for receiving the aqueous medium containing microorganisms. A pressure differential inducer is associated to the intake so as to receive the aqueous medium containing microorganisms with a desired level of gas saturation. The pressure differential inducer is actuatable to expose the aqueous medium containing microorganisms with a desired level of gas saturation to accelerations so as to cause cell wall rupture of the microorganisms. An outlet is associated with the pressure differential inducer for outletting the treated aqueous medium containing ruptured microorganism cells and contents. The treated aqueous medium containing ruptured cell wall of the microorganisms is disposed of and/or recycled.

8 Claims, 2 Drawing Sheets

U.S. PATENT DOCUMENTS

| | | | |
|---|---|---|---|
| 5,254,253 A * | 10/1993 | Behmann | 210/607 |
| 5,494,585 A * | 2/1996 | Cox | 210/748 |
| 5,693,222 A * | 12/1997 | Galvan et al. | 210/199 |
| 5,932,112 A * | 8/1999 | Browning, Jr. | 210/205 |
| 6,019,947 A * | 2/2000 | Kucherov | 210/748.01 |
| 6,059,971 A | 5/2000 | Vit et al. | |
| 6,200,486 B1 | 3/2001 | Chahine et al. | |
| 6,241,485 B1 * | 6/2001 | Warwick | 417/300 |
| 6,605,220 B2 | 8/2003 | Garcia et al. | |
| 2002/0158010 A1 * | 10/2002 | Bowman et al. | 210/609 |

FOREIGN PATENT DOCUMENTS

| | | |
|---|---|---|
| CA | 2 357 619 A1 | 3/2002 |
| GB | 2273926 A | 7/1994 |
| JP | 1-231987 A | 9/1989 |
| JP | 11-504561 T | 4/1999 |
| JP | 11-156399 A | 6/1999 |
| JP | 2002-200486 A | 7/2002 |
| JP | 2002-522211 T | 7/2002 |
| JP | 2002-361239 A | 12/2002 |

OTHER PUBLICATIONS

Higby, Christine, "Feasibility Study of Sludge Lysis and Recycle, Extended Aeration in the Activated Sludge System", Masters Thesis (1992).

DiGiacomo, David A., Feasibility Study of Cavitational Sludge Lysis and Effluent Recycling in the Activated Sludge Process, Masters Thesis (1995).

* cited by examiner

APPARATUS AND METHOD FOR THE NON-CHEMICAL STABILIZATION OF BIO-SOLIDS

CROSS-REFERENCE TO RELATED APPLICATION

The present patent application claims priority on U.S. Provisional Patent Application No. 60/681,465, filed on May 17, 2005, by the present applicants.

FIELD OF THE INVENTION

The present invention relates generally to an apparatus and method for treating an aqueous medium such as water and wastewater, and/or sludge treatment systems and methods for improving the operation of a bio-reactor, and, more particularly, to such apparatuses and methods using non-chemical techniques.

BACKGROUND OF THE INVENTION

Modern municipal sewage and industrial waste treatment plants utilize conventional mechanical and biological processes to reclaim wastewater. The conventional method converts a water pollution problem into a solid waste disposal problem. The disposal of microbial sludge solids (e.g., of microbiological or biological nature) resulting from conventional municipal sewage treatment has historically been expensive because of the extremely large volumes of sludge produced and other problems due to the inherent toxicity and potentially bio-hazardous nature of this waste sludge to the environment. This is especially evident in bio-hazard "hot" zones—such as areas of Mexico and areas within the southern United States, and others—where human parasites can be incubated within biological systems and then transmitted to others through land-spreading, irrigation and other methods of disposal of the contaminated microbial sludges. Such extraction and disposal of microbial sludge is expensive and wasteful.

Waste sludges, especially those comprised of and/or mostly composed of bio-solids (microbial-contaminated materials), have long been the most significant problem associated with activated sludge and other aerobic and/or anaerobic wastewater treatment plants. These sludges are difficult and expensive to dry and are difficult and expensive to sterilize/stabilize. These sludges can contain high fractions of volatiles. The decreased availability of landfills and the reduced acceptability of using these sludges as fertilizer/land spread for agricultural purposes have brought about significant cost increases for the disposal. In some areas, microbial sludges are banned altogether from landfills because of the high pollution potential and the presence of active microbial catalysts and solids (VS), and they retain large amounts of water (70% or more before drying).

The decreased availability of landfills and the reduced acceptability of using these sludges as fertilizer/land spread for agricultural purposes have brought about significant cost increases for the disposal. In some areas, microbial sludges are banned altogether from landfills and as land-spread fertilizers because of the high pollution potential, the presence of active microbial catalysts and the potential for these sludges to become vectors for the spread of pathogenic organisms and diseases.

Various techniques have been developed for the purpose of sterilizing, stabilizing or decontaminating aqueous media containing microorganisms such as biological sludges and wastes including:

U.V. sterilizers;

Pressurization/depressurization cyclic sterilization (using air-cap in a pressure vessel or no air-cap but in a pressure vessel);

Sterilization through exposure of material or solution to a super-critical solution;

Gamma irradiation or similar irradiation methods;

Exposure to a vacuum;

Exposure to strong electromagnetic fields;

Sonofication;

Sterilization through chemical exposure to strong acids (lowering pH of total solution to near or below 2 for an extended period of time) or strong alkalis (raising pH of total solution to near or above 12 for and extended period of time);

Sterilization through high ionic strength solutions;

Heat sterilization;

Physical mincing;

Cycling between high and low pressures, no air cap or other air-induction;

Adding pressure to chemical sterilizing mixtures to increase speed of sterilization;

Flashing using heat and/or steam on high solids waste to develop explosive decompression, followed by shearing; and Ozone, peroxide and other strong oxidizing agents.

Those techniques are either too expensive for commercial applications, require additional treatment steps, cause additional pollution loads or are ineffective to treat aqueous media containing microorganisms (for example to cause the sterilization of sludges). There is therefore a great need to provide an improved method for treating such aqueous media containing microorganisms.

SUMMARY OF INVENTION

It is therefore an aim of the present invention to address issues pertaining to the prior art.

Therefore, in accordance with the present invention, there is provided an apparatus for treating an aqueous medium containing microorganisms comprising: an intake for receiving the aqueous medium containing microorganisms; a pressure differential inducer associated to the intake so as to receive the aqueous medium containing microorganisms with a desired level of gas saturation, the pressure differential inducer being actuatable to expose the aqueous medium containing microorganisms with a desired level of gas saturation to accelerations so as to cause cell wall rupture of the microorganisms; and an outlet associated with the pressure differential inducer for outletting the treated aqueous medium containing ruptured microorganism cells and contents; whereby the treated aqueous medium containing ruptured cell wall of the microorganisms is at least one of disposed of and recycled.

Further in accordance with the present invention, there is provided a method for treating an aqueous medium containing microorganisms with a desired level of gas saturation, comprising the steps of: i) feeding the aqueous medium containing microorganisms to a pressure differential inducer; ii) actuating the pressure inducer to expose the aqueous medium containing microorganisms with a desired level of gas saturation to accelerations so as to cause cell wall rupture of the microorganisms; and iii) outletting the treated aqueous medium containing ruptured cell wall of the microorganisms from the pressure differential inducer; whereby the treated aqueous medium containing ruptured cell wall of the microorganisms is at least one of disposed of and recycled.

BRIEF DESCRIPTION OF DRAWINGS

Having thus generally described the nature of the invention, reference will now be made to the accompanying drawings, showing by way of illustration a preferred embodiment thereof, and in which.

DETAILED DESCRIPTION OF PREFERRED EMBODIMENTS

Figure 1:
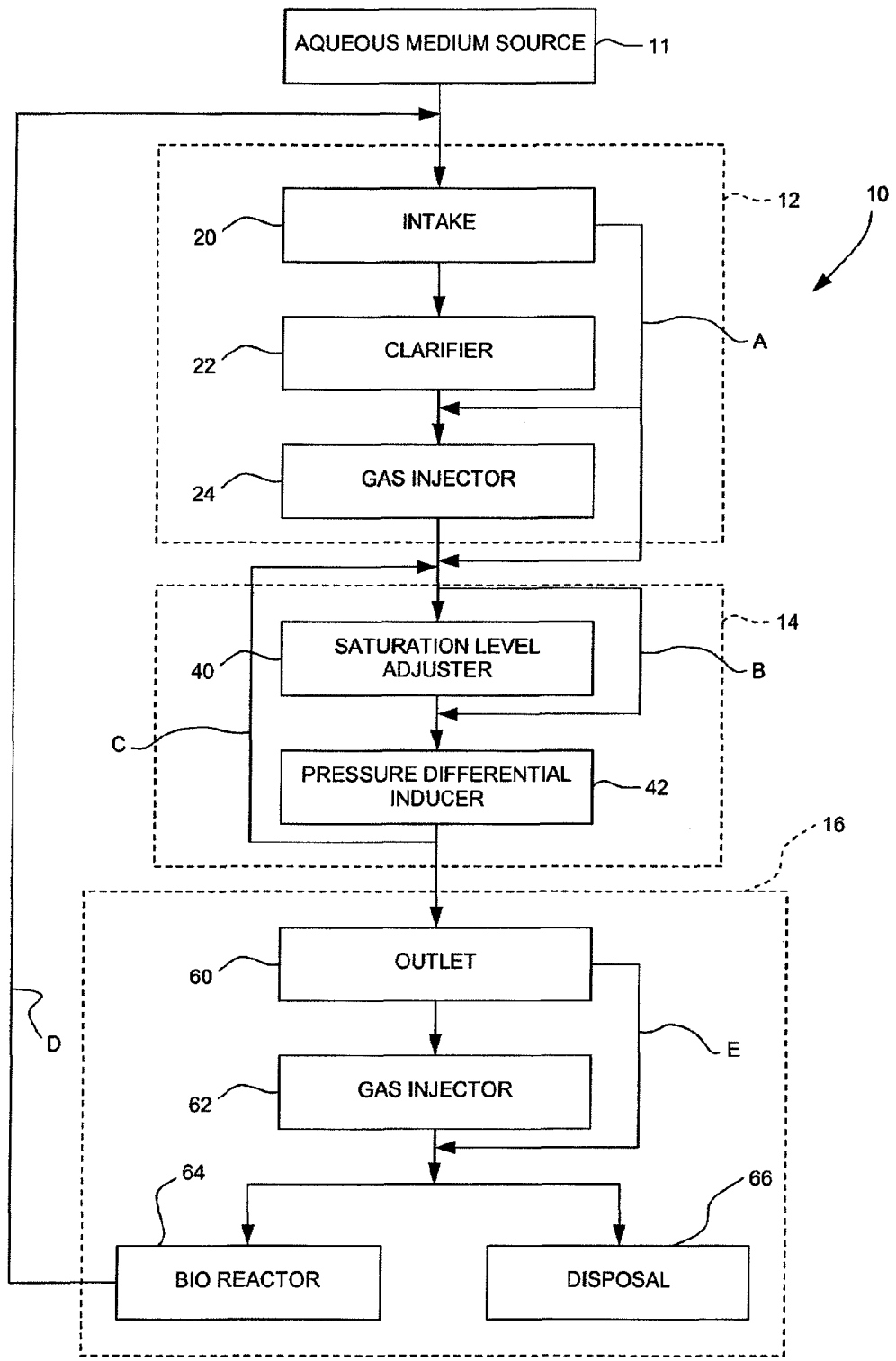
FIG. 1 is a block diagram illustrating an apparatus for treating aqueous media containing microorganisms in accordance with an embodiment of the present invention.

The features that characterize the embodiments, as to method of operation, together with further objects and advantages thereof, will be better understood from the following description used in conjunction with the accompanying drawing. These and other objects attained, and advantages offered, by the present invention will become more fully apparent in view of the description that now follows.

A new apparatus and method for treating an aqueous medium containing microorganisms is provided herein.

It has been found that in one aspect, the apparatus described herein provides an efficient and cost-effective new method to treat these aqueous media and to substantially reduce or eliminate disposal requirements for aqueous media containing microorganisms such as bio-solid sludges.

A further unique aspect of this apparatus is that, while reducing or virtually eliminating the need to dispose of bio-solid sludges, the apparatus may also improve the operation of bio-reactors and reduce costs for micro-nutrients. In particular it is possible if desired to recycle at least some of the treated aqueous media in a bio-reactor to provide the necessary micro-nutrients. An immediate economic result is foreseen by the lowered operation costs as a result of lower transport and disposal costs, lower sludge thickening polymer costs, lower odor control chemical costs, and others which include greater value and more options for the disposition of primary clarifier/screening sludges. The apparatus 10 described hereinafter is relatively simple in construction and operates on relatively low levels of energy. This adds to the cost-efficiency of the apparatus 10.

The terms "treating" or "treated" are meant to include sterilizing, disinfecting and/or stabilizing and/or similar terms.

The term "aqueous media" is meant to include aqueous solution or suspension, municipal, agricultural, and industrial wastewater, storm water runoff from agricultural, suburban, and urban development, primary, secondary or tertiary sludges containing microorganisms.

The term "recycled" is meant to include the activities by which the treated aqueous medium is collected and further treated or used as raw material or nutrient or otherwise. A non-limiting example includes recycling to a bio-reactor.

The term "nutrient" as used herein refers to any substance that can be used by cells, microbes or microorganisms in order to multiply or grow. It can be minerals such as calcium, potassium and molecules such as amino-acids, peptides, proteins, saccharides, polysaccharides or the like that can be used, as well as cell wall material.

In one embodiment, a bio-reactor makes use of the treated microbial sludge that contains desirable nutrients that can be utilized as a food source for bio-reactors.

In a further embodiment, the method for treating an aqueous medium containing microorganisms, causes the nutrients contained in the cytoplasm of the cells of microbes or microorganisms to be exposed. The cell walls themselves can be a useful food source when cell wall structures are suitably destructed. As bio-reactors tend to be unique from each other as to their particular make-up of micro-organisms and micro-fauna, and the particular make-up of the living micro-organisms and micro-fauna of any particular bio-reactor may even change through time and seasons, a satisfactory source of nutrients and micro-nutrients for any particular bio-reactor would be that available within the aqueous media to be treated (e.g. microbial sludges).

Without being bound to theory, it is believed that admitting the treated aqueous medium to the bio-reactor has desirable effects on the reactor operation such as improved aerobic, anaerobic and sequencing/cyclic bio-reactor efficiency, improved bio-reactor stability, lowered bio-reactor nutrient feed requirements and lowered bio-reactor operating cost or a combination of anyone of these.

In one embodiment, the aqueous media are primary, secondary or tertiary sludges.

In further embodiments:
the sludge is resulting from water and/or wastewater treatment processes;
the primary sludge is produced by a primary solid separation equipment;
the secondary sludge is produced by an aerobic or anaerobic reactor;
the tertiary sludge is produced by a tertiary treatment equipment.

In one embodiment, the aqueous medium is exposed to the forces, including centripetal (so called "g" forces and others), resulting from the action of a mechanical device such as an impeller so as to cause cell wall rupture of the microorganisms.

In one embodiment, the aqueous medium is repeatedly exposed to these forces resulting from the action of a mechanical device such as an impeller, so as to cause cell wall rupture of the microorganisms.

In further embodiments:
the method further comprises adding gas to the aqueous medium;
the method further comprises adding gas to the aqueous medium before feeding the aqueous medium containing microorganisms to a pressure differential inducer;
the aqueous medium is substantially saturated with gas; the gas can be, amongst other gases, any one of air, oxygen or nitrogen.

In further embodiments, the method for treating an aqueous medium containing microorganisms further comprises clarifying the aqueous medium containing microorganisms in a clarifier prior to the pressure treatment, so as to increase the concentration of bio-solids by separating fluid from the aqueous medium.

In further embodiments, the method for treating an aqueous medium containing microorganisms further comprises directing the treated aqueous medium containing ruptured cell wall of the microorganisms to a bio-reactor after the pressure treatment.

In one embodiment, the centrifugal pump is a submersible pump. However, it will appear to a skilled person that alternative mechanical devices (such as a motor drive, windmill or other mechanical drive) capable of operating a centrifugal pump may be substituted.

In one embodiment, the centrifugal pump is a submersible multi-stage pump.

In one embodiment, the centrifugal pump has a plurality of impellers.

In a further embodiment, the centrifugal pump has at least 2 impellers.

It will appear to a skilled person that alternative pumps such as piston, or diaphragm pumps can be used in proper configuration to accomplish the desired pressure-inducing action on the aqueous medium to be treated.

The present invention will now be described in detail for specific preferred embodiments of the invention, it being understood that these embodiments are intended only as illustrative examples and the invention is not to be limited thereto.

Referring to FIG. 1, an apparatus for treating aqueous media in accordance with a preferred embodiment is generally shown at 10. The apparatus 10 generally has an intake section 12, a treatment section 14 and an outlet section 16.

The intake section 12 is provided to receive aqueous medium containing microorganisms. The aqueous medium is then directed from the intake section 12 to the treatment section 14, in which the aqueous medium containing microorganisms will be exposed to a pressure treatment so as to cause cell wall rupture of microorganisms within the aqueous medium.

The outlet section 16 is provided in association with the treatment section 14, so as to outlet the treated aqueous medium.

The various sections of the apparatus 10 are connected by suitable lines for the flow of the aqueous medium between the sections. One of the lines is illustrated as line A, and interrelates various components of the intake section 12 to the treatment section 14.

Line B is provided to bypass a component of the treatment section 14.

Line C is provided in order to enable recirculation of the aqueous medium in the treatment section 14.

Line D is optionally provided in order to enable the aqueous medium to be fed from the bio-reactor 64 to the intake section 12 for treatments within the apparatus 10.

The intake section 12 has an intake 20. The intake 20 is typically an opening in a pipe or a line, in which the aqueous medium is received in the apparatus 10. The aqueous medium is, for instance, provided by a source 11 or is recycled by the apparatus 10. The intake 20 is optionally provided with filters. Depending on the source of aqueous medium, it may be desirable to filter out coarse solids from the aqueous medium, whereby this task is effected in the intake section 12 (e.g., at the intake 20 or clarifier 22).

A clarifier 22 connected to the intake 20 is optionally provided in order to remove unwanted liquids (e.g., clarified water) from the aqueous medium to an effluent. As shown in FIG. 1, line A enables the clarifier 22 to be bypassed.

A gas injector 24 is provided so as to optionally add a gas to the aqueous medium. As will be discussed hereinafter, some level of gas saturation of the aqueous medium is required to cause cell wall rupture. It may therefore be required to inject some gas in to the aqueous medium in the intake section 12 so as to reach this level of gas saturation. On the other hand, the aqueous medium may already have a suitable level of saturation, whereby line A allows the gas injector 24 to be bypassed. Following experimentation, the addition of gas to the aqueous medium can enhance effectiveness of the cell wall rupture of some of the microorganisms contained by the aqueous medium.

The treatment section 14 involves equipment exposing the aqueous medium to a pressure treatment. More specifically, the aqueous medium is fed to the treatment station 14 with a suitable level of gas saturation. The saturation involves gas absorption by the microorganisms of the aqueous medium. The pressure treatment consists in submitting the gas-filled microorganisms to multiple accelerations, which accelerations will result in the cell wall rupture of the microorganisms.

To some extent, an increase in saturation of the aqueous medium, e.g., toward supersaturation, will enhance the effectiveness of the pressure treatment in rupturing cell walls and killing microorganisms. Therefore, a saturation level adjuster 40 is optionally provided to increase the level of gas saturation of the aqueous medium.

Figure 2:
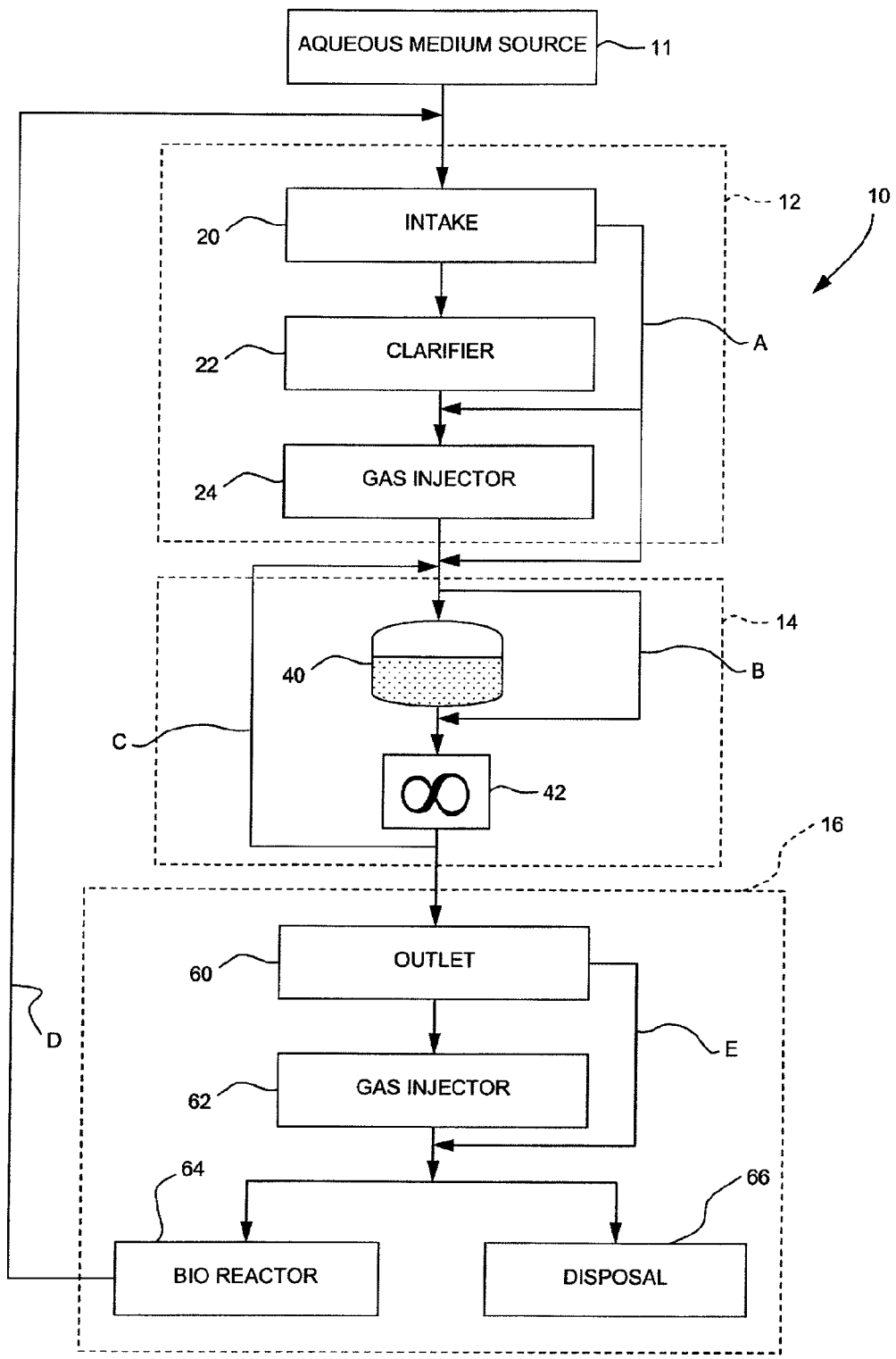
FIG. 2 is a block diagram illustrating the apparatus of FIG. 1, with a tank and impeller pump illustrated schematically.

As illustrated in FIG. 2, the saturation level adjuster 40 is typically a tank adapted to sustain pressure drops. The gas-saturated aqueous medium is isolated in the tank, and the pressure in the tank is dropped so as to cause some level of supersaturation for the aqueous medium. The increase in saturation will increase the compressibility of the aqueous medium. As a result of the increased compressibility, the subsequent multiple accelerations created in the pressure differential inducer 42 will be more effective in rupturing cell walls.

The adjuster 40 is optional and may be bypassed by way of line B.

The pressure differential inducer 42 typically involves mechanical devices acting on the gas-saturated aqueous medium. As an example, pumps are provided in the treatment section 14, and are typically of the centrifugal type in a multi-stage configuration. Therefore, saturated aqueous medium from the intake 20 is exposed to impellers of the various pumps, which will cause cell wall rupture. The multiple accelerations (e.g., centrifugal, tangential, capillary accelerations and/or accelerations/decelerations) will be caused by the mechanical environment of the inducer 42, such as impellers (as shown in FIG. 2), pump casing structures, piping walls (e.g., configured in coils adjacent to a mechanical pressure inducer, such as a pump). As liquid and gas are present in the saturated aqueous medium, the multiple accelerations will occur at different rates for the liquid and gas. This rate differential will cause cell wall rupture of the microorganisms having absorbed gas as the solution compresses and then fractionates.

As shown in FIG. 1, the line C is provided so as to enable the saturation level adjuster 40 and/or the pressure differential adjuster 42 to be used repeatedly in any appropriate sequence. Numerous cycles in the treatment section 40 can be performed to optimize the process efficacy. Multiple stages generally enhance the performance of the apparatus 10.

Additionally, if the pressure differential inducer 42 involves pumps, it is observed that cavitation caused by the pumps will increase the performance of the apparatus 10 in rupturing microorganisms.

The outlet 60 is typically an outlet of piping of the apparatus 10. A gas injector 62 associated to the outlet is provided so as to optionally add a gas to the treated aqueous medium. Without being bound to theory, it is believed that injecting air, especially oxygen, into the feed stream that returns the treated aqueous medium (inherently containing nutrients and micronutrients released from a microorganism and/or microbe-containing sludge) would further enhance aerobic and sequencing/cyclic bio-reactor efficiencies and/or stability and further lower bio-reactor operating costs—especially those associated with bio-reactor aeration devices, commonly referred to as "blowers." Upon outletting the aqueous medium having been treated, the aqueous medium may be recycled, for instance in a bio-reactor 64, or be disposed of, as shown by disposal 66.

In the event that the aqueous medium to be treated is provided by the bio-reactor 64 a line D is provided for the transportation of the aqueous medium from the bio-reactor 64 to the intake 20 for treatment in the apparatus 10. In such instances, the aqueous medium may have a high level of liquids, whereby the clarifier 22 can be used to remove such liquids. It is pointed out that all components of the apparatus 10 are provided with suitable controls in order to ensure the appropriate treatment of the aqueous medium in the apparatus 10.

As a practical example, with regard to the pressure differential inducer 42, centrifugal pumps are well known in the art. A centrifugal pump has two main components: (1) a rotating component comprised of an impeller and a shaft, and (2) a stationary component comprised of a casing, casing cover, and bearings.

As needed, the centrifugal pump may include a manual or automatic pressure and/or flow control valve at the centrifugal pump outlet and/or multiple valves at multiple points, or may otherwise utilize specific pipe sizes/diameters and lengths to control pump pressure and flow.

For the gas injector 24, an air induction means, such as a venturi, can provide the dual function of (1) pressure and/or flow control valve, and (2) adding gas to the aqueous medium using the energy available from the action of the centrifugal pump.

The impeller is the main rotating part that provides the acceleration to the fluid. The above-described embodiment is not limited by a particular shape or type of impeller.

Water enters the eye of the impeller and is thrown out by the forces generated by rotation. The pressure that a centrifugal pump will develop can be considered as direct relationship between the impeller diameter, the number of impellers, the eye or inlet opening size, and how much velocity is developed from the speed of the shaft rotation. Capacity is determined by the exit width of the impeller and can be readily adjusted to the specific needs. All of these factors affect the horsepower size of the motor to be used; the more water to be pumped or pressure to be developed, the more energy is needed.

Once the aqueous medium has been exposed to the force (i.e., accelerations) resulting from the action of a first impeller, it may be directed to another impeller stage or another centrifugal pump to further treat the medium. Alternatively the treated medium may be directed into a piping system, to be returned into a biological reactor (e.g., outlet 16) so that the nutrients are now made available in order to enhance the operation of aerobic biological reactors as a result of the release of intra-cellular components and other fluids.

As mentioned previously, it is believed that forces are developed as the liquid flows through the impeller while it is turning at high speeds on the shaft. The liquid velocity is converted to pressure, centripetal and shear forces, cavitation and other forces. The forces resulting from these actions cause the microorganisms and microorganisms' cells to be ruptured at high enough RPM, thereby resulting in the stabilization of said solution.

As for the speed of actuation of the mechanical device of the pressure differential inducer 42, it is preferred to operate at higher speeds to increase the rupturing effect on the microorganisms. By having the velocity within the pump(s)/piping exceed the speed of sound of the solution, enhanced effectiveness and high-energy cavitation will be reached.

Example 1

As illustration of one embodiment, in operation, water, wastewater and/or sludge that are near or above gas saturation is entered into a multistage submersible centrifugal pump at about 3450 RPM. The resulting treated aqueous medium is directed into a piping system to be recycled to a bio-reactor or disposed of, or directed to another centrifugal pump for further treatment, or the medium is directed to a further treatment operation as required.

Example 2

The sludge that was entered into a compression tank with prior gas addition through the gas injector 24 that is a venturi (resulting in near or above gas saturation). The tank 40 and the content were pressurized to 5 atm over a period of 172 seconds. Once the desired internal pressure was obtained, the tank was allowed to decompress substantially instantly. The pressurization and depressurization cycle is repeated a second time. The resulting treated sludge is then directed into a piping system to a further treatment operation, namely the pressure differential inducer 42.

The resulting treated sludge obtained from the previous step was entered into a multistage submersible centrifugal pump (40) having 6 impellers and operating at 3450 RPM.

The resulting treated sludge is directed into the outlet section 16 to be recycled to the bio-reactor 64 or disposed of 66, or directed to another centrifugal pump using line C for further treatment, or the medium is directed to a further treatment operation as required.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

The invention claimed is:

1. A method for treating an aqueous medium containing microorganisms with a desired level of gas saturation, comprising the steps of:

i) saturating the aqueous medium containing living microorganisms with gas to the desired level of gas saturation for the living microorganisms to absorb the gas;

ii) feeding the aqueous medium containing the living microorganisms to a pressure differential inducer, the pressure differential inducer having a casing and at least one pump with an impeller located in the casing;

iii) killing a portion of the living microorganisms by actuating the pressure inducer above a given speed to expose the aqueous medium containing the living microorganisms with the desired level of gas saturation to accelerations by the force resulting from the action of the impeller of the pump so as to cause cell wall rupture of the living microorganisms, thereby killing a portion of the microorganisms, a portion of the aqueous medium being exposed to velocities at or above a speed of sound of the aqueous medium; and iv) outletting the treated aqueous medium containing ruptured cell wall of the microorganisms from the pressure differential inducer, whereby the treated aqueous medium containing ruptured cell wall of the microorganisms is at least one of disposed of and recycled.

2. The method as defined in claim 1, wherein the step of saturating the aqueous medium containing microorganisms with gas produces a gas-saturated aqueous medium containing microorganisms.

3. The method as defined in claim 1, further comprising a step of adjusting the level of gas saturation of the aqueous medium containing microorganisms so as to supersaturate the aqueous medium prior to step iii).

4. The method as defined in claim 3, wherein the step of adjusting the level of gas saturation is performed by pressurizing and depressurizing the aqueous medium containing microorganisms.

5. The method as defined in claim 1, wherein step iii) comprises repeating the exposure of the aqueous medium containing microorganisms to the force resulting from the action of an impeller.

6. The method as defined in claim 1, further comprising a step of clarifying the aqueous medium containing microorganisms prior to step iii).

7. The method as defined in claim 1, further comprising directing the treated aqueous medium containing ruptured cell wall of the microorganisms to a bio-reactor.

8. The method as defined in claim 1, further comprising adding gas to the treated aqueous medium after step iii).

\* \* \* \* \*